UNITED STATES PATENT OFFICE 2,351,352

SEPARATION OF BY-PRODUCTS FROM ISOPHORONE

Sumner H. McAllister, Lafayette, and William A. Bailey, Jr., Oakland, Calif., assignors to Shell Development Company, San Francisco, Calif., a corporation of Delaware No Drawing. Application July 29, 1941, Serial No. 404,512

4 Claims. (Cl. 260—586)

This invention relates, in particular, to an improved method for the separation of certain by-products such as mesityl oxide and/or diacetone alcohol from isophorone, which substances are obtained as by-products in methods of producing isophorone. The invention, in its broader aspect, is concerned with the process of selectively and catalytically reverting by-product ketones back to the parent ketone when they are mixed with a cyclic ketone of the type of isophorone.

Isophorone has been prepared by a number of different processes, but the product which is obtained by these processes is always contaminated by a number of by-products. For example, acetone may be treated in the liquid phase with aqueous solutions of alkali metal hydroxides such as sodium hydroxide at a temperature between about 100° C. and 200° C., and isophorone may be obtained as the principal conversion product. However, it is desirable to operate the process so that only about 20% of the acetone treated is converted to higher conversion products, of which the principal product is isophorone, there also being present compounds of lower boiling point than isophorone like mesityl oxide, diacetone alcohol, and possibly some phorone, as well as compounds higher-boiling than isophorone in minor proportions. In order to separate the isophorone in a substantially pure state, especially in a continuous mode of operation such as is used in commercial practice, a complex distillation procedure must be followed. For example, the operation may involve passing the crude product from the reaction converter first to a distillation column for separation of acetone, then to a column to remove mesityl oxide, then to a vacuum column for removal of diacetone alcohol, and finally to a column for recovery of the desired isophorone. Furthermore, if phorone is present in the crude product in appreciable quantities, an additional column is required before the isophorone column. Another disadvantage of this method of operation is that the disposal of the by-products, mesityl oxide, diacetone alcohol, and possibly phorone, presents a problem which may reach serious proportions in the commercial application of the method.

It is an object of the present invention to provide a simple and efficient process for the separation of isophorone and lower-boiling by-products obtained in the production thereof. Another object is to provide a process whereby the by-products are reverted to acetone, the parent ketone, from which further isophorone may be produced. A further object is to provide a process for the separation of cyclic ketones of the type of isophorone from lower-boiling ketone by-products and reversion of these by-products to the parent ketone from which they and the cyclic ketone are derived.

These and other objects which will be apparent from the description of the invention are accomplished by treating the crude product containing the cyclic ketone of the type of isophorone and the by-product ketones associated therewith with an aqueous solution of a basic-acting compound at a temperature above 100° C. whereby the by-product ketones of lower boiling point than the cyclic ketone are selectively and catalytically reverted to the parent ketone, and the formed parent ketone is separated from the cyclic ketone simultaneously with, or subsequent to, its formation. It was found that treatment of the crude material under the above-mentioned conditions caused the reversion of the lower-boiling by-product ketones to the parent ketone, but that reversion of the cyclic ketone of the type of isophorone to the parent ketone does not occur. Furthermore, in executing the process of the invention, it is desirable to operate with a dilute aqueous solution of a basic-acting compound since the treatment with a solution of low basicity substantially avoids condensation of the compounds in the reaction mixture to higher products which are undesirable.

By the expression, "a cyclic ketone of the type of isophorone," reference is made to isophorone and homologues thereof, which homologues are commonly known in the art as "homo-isophorones." These cyclic ketones may be prepared from a variety of condensable ketones such as aliphatic, alicyclic, or aliphatic-alicyclic ketones. As examples of these, there may be named such compounds as acetone, methyl ethyl ketone, methyl propyl ketone, diethyl ketone, methyl isopropyl ketone, methyl cyclohexyl ketone, ethyl cyclopentyl ketone, cyclohexanone, cyclopentanone, alpha-methyl cyclopentanone, and the like. The by-products which are obtained with the homo-isophorones are homologues of those produced with isophorone in its synthesis. The by-product ketones of lower boiling point than the homo-isophorones with which they are associated are homologous to mesityl oxide and diacetone alcohol, and are revertible to the parent ketone in the treatment according to the process of the invention. While hereinafter the invention will be described in detail with particular reference to isophorone, this is done merely for convenience, and it is to be understood the invention is applicable in a like manner to the separation of the by-product ketones from the homo-isophorones.

The crude reaction product obtained in the synthesis of isophorone may be subjected to several modes of treatment according to the invention in order to effect the separation of the by-products from the isophorone. The crude material ordinarily contains a considerable proportion of acetone. If desired, this may be distilled from the mixture first and only the residue treated. Ordinarily it is preferable to treat the crude material per se without a preliminary removal of acetone since the treatment causes the mesityl oxide and diacetone alcohol contained therein to revert to acetone and then both the formed acetone and initially present acetone may be separated from the isophorone in a single operation. The separation of the acetone from the isophorone may be made either after the reversion of the lower-boiling by-products or during their reversion. The crude material containing the lower-boiling by-product ketones and the isophorone may be contacted with the aqueous solution of a basic-acting compound at a temperature above 100° C. for a period of time sufficient to effect reversion of the mesityl oxide, diacetone alcohol, and phorone, if present, and subsequently the acetone may be separated from the isophorone in a separate step. The preferred embodiment of the invention involves combining these two steps into a single operation. The crude material is subjected to distillation in the presence of the aqueous basic solution at a temperature above 100° C. and acetone is removed as distillate during formation thereof by the reversion reactions.

Although reversion of the lower-boiling by-product ketones may be effected at atmospheric pressure and under reflux conditions, the reactions when thus effected proceed very slowly so that excessively long periods of time are necessary to change the by-product ketones to the parent ketone from which they were derived. By the use of temperatures above 100° C., the rate of the reversion reactions of the by-product ketones is greatly increased, but, surprisingly, the isophorone in the reaction mixture remains substantially unaffected when the treatment is made at superatmospheric pressures. It is known that, in general, increased temperatures and pressures would be expected to cause condensation of all the ketones in the mixtures treated since the treatment is effected in the presence of a basic compound which catalyzes condensation reactions. However, contrary to such general expectations, the use of superatmospheric pressures and of temperatures above 100° C. permits relatively rapid reversion of the lower-boiling by-product ketones to the parent ketone without appreciable reversion of the isophorone or the formation of other condensation products. The effecting of the aforementioned reactions at elevated temperatures and pressures also permits the use of relatively low concentrations of the basic-acting compound without materially affecting the degree and rate of reversion of the by-product ketones into the lower-boiling parent ketone which may be readily separated from the reaction mixture as by fractional distillation. This is quite advantageous since the more concentrated solutions of basic-acting compounds generally tend to promote or induce the condensation of ketones to higher-boiling compounds. The use of the lower concentrations of the basic compounds therefore increases the overall yield of isophorone since the lower-boiling by-product ketones are reverted to acetone, which may be separated and recondensed to produce additional quantities of isophorone. By subjecting the crude mixture obtained in the preparation of isophorone to the action of water in the presence of a small amount of a basic-acting compound, e. g. a dilute aqueous solution of caustic soda, at superatmospheric pressures and temperatures of above 100° C., substantially all of the mesityl oxide and diacetone alcohol is reverted back to acetone which may readily be recovered. This acetone may then be re-utilized to form additional quantities of isophorone, thus increasing the overall yield thereof. When effected according to the preferred embodiment of the invention, the separation of the lower-boiling by-products from the the isophorone is substantially quantitative, there being substantially no side reactions of the type of condensation of either of the by-product ketones or the isophorone.

Although the optimum operating temperature for effecting the process of the invention will vary depending upon a number of variables such as the specific mixture treated, the basic catalyst employed, its concentration in the aqueous solution, the operating pressure, etc., it may be stated generally that the reaction should be effected at a temperature above 100° C., the preferred temperature being between about 130° C. and 200° C. The upper temperature limit is usually determined by the occurrence of side reactions such as condensation and/or pyrolytic decomposition reactions, which occur when excessively high temperatures at the existing operating pressure are employed. In order to permit the use of these temperatures, it is necessary to employ superatmospheric pressures which will vary within wide limits depending upon the aforementioned conditions. At these atmospheric pressures, at least a portion of the reactant mixture is maintained in a liquid state.

It was pointed out above the use of superatmospheric pressures and elevated temperatures (preferably above 100° C.) considerably increases the rates of the reversion reactions and also permits the use of relatively dilute concentrations of the basic compound. Although the reaction period may vary within relatively wide limits, it may generally be stated that the hydrolysis and decomposition of the by-product ketones in the reaction mixture is substantially complete within a comparatively short time (for example, about fifteen minutes) when the treatment is effected at temperatures in the neighborhood of 150° C. and at pressures of about 75 to 150 pounds per square inch, with an aqueous solution of a basic compound, said solution having a hydrogen ion concentration equivalent to that of a 1% aqueous solution of sodium hydroxide. The reaction time necessary for reversion of the by-product ketones will be shorter with increased concentrations of the basic compound employed as catalyst, and vice versa. As to the catalyst, it is possible to employ any basic-acting compound capable of promoting the desired reversion reactions. Suitable compounds include metal hydroxides, carbonates, borates, etc., which are alkaline-reacting and capable of effecting the desired results. A preferred group of basic-acting compounds is the alkali metal and alkaline earth hydroxides, as well as suitable basic-reacting salts of strong bases and weak acids such as the carbonates, borates, etc. The quantity of the basic compound may vary depending on the basicity of the specific catalyst employed. For instance, it is necessary to employ a somewhat larger amount or concentration of a weak base as compared to the quantity or concentration necessary for the same degree of conversion (other conditions being equal) when a strongly basic compound is used as the catalyst. Although weakly basic solutions may be employed, such aqueous solutions will require excessive periods of time to catalyze the reversion reactions of the lower-boiling by-product ketones. Therefore, as a general rule, it is preferable to employ solutions of a basicity not materially lower than that of a one-tenth normal solution of sodium hydroxide. However, in some cases, solutions having a considerably lower basicity, e. g. as low as that of a one-hundredth normal solution of NaOH, may be used. As to the upper limit, it was pointed out above that excessively high concentrations of strongly basic compounds promote the condensation of the ketones in the mixtures to be treated to higher, undesirable products, and therefore should be avoided generally. The practical upper limit will vary with other operating conditions, e. g. temperatures and pressures employed. For example, by lowering the pressures and temperatures it is possible, and frequently desirable, to employ relatively higher concentrations of compounds which are strongly basic, whereas, when operating at more elevated temperatures and pressures, the same degree of conversion is attainable by using smaller amounts of a weaker basic compound which may be employed in relatively lower concentrations. In general, it is preferable to employ a solution with a hydrogen ion concentration not substantially greater than that equivalent to a one-normal solution of sodium hydroxide. The quantity of water (containing the aforementioned basic-acting catalyst compound) which is to be employed for the reversion reactions, may also vary. However, in most cases it is preferable to employ water in a quantity greatly in excess of that necessary for the hydration of the mesityl oxide. In the case where the treatment of the mixture is effected continuously with simultaneous reversion of by-products and distillation of formed parent ketone from the mixture, it may be desirable to introduce water with the feed to the still since the ketone, including acetone, will distill azeotropically with water and tend to deplete the catalyst solution of water.

For the purpose of further illustrating the process of the invention in greater detail, the following example is given, it being understood that the invention is not to be construed as limited to the particular details given therein.

*Example*

A synthetic mixture which approximates the composition of the crude material obtained in the synthesis of isophorone after removal of unreacted acetone therefrom was prepared with the exception that the substances boiling higher than isophorone were omitted so as to observe the possible formation of such materials when treated according to the process of the invention. The treatment consisted of distilling the acetone formed from the mixture, the distillation being made in the presence of a solution of 1% sodium hydroxide at a kettle temperature of 150° C.–160° C. (stillhead temperature of 118° C.–125° C.) and under 75–80 pounds per square inch pressure. The amount and composition of the mixtures before and after the distillation, which took about 50 minutes, are tabulated below.

| Component | Before distillation | | After distillation | | Percent reversion |
|---|---|---|---|---|---|
| | Grams | Percent | Grams | Percent | |
| Acetone | 0 | 0 | [1] 731 | [1] 28.0 | |
| Mesityl oxide | 450 | 18.1 | 11 | 0.45 | 97.5 |
| Diacetone alcohol | 200 | 8.0 | 0 | 0 | 100 |
| Isophorone | 500 | 20.1 | 489 | 20.0 | |
| Higher products | 0 | 0 | [2] 7 | [2] 0.28 | |
| 1% caustic solution | 1,340 | 53.8 | 1,252 | 51.2 | |

[1] Taken overhead as distillate.
[2] Distillation bottoms which probably contained some isophorone.

This application is a continuation-in-part of our copending application, Serial No. 367,566, filed November 28, 1940, now issued as U. S. Patent No. 2,254,615.

We claim as our invention:

1. In a process for producing isophorone by condensing acetone and recovering a mixture comprising mesityl oxide, diacetone alcohol and isophorone, the improvement of substantially freeing said isophorone from mesityl oxide and diacetone alcohol which comprises commingling said mixture with 0.1- to 1-normal aqueous sodium hydroxide solution in an amount sufficient to provide a great excess of water over that needed to hydrate the mesityl oxide in said mixture and distilling acetone from the reaction mixture at a distilling temperature of from 130° C. to 200° C., said distillate acetone being formed by selective and catalytic reversion of the mesityl oxide and diacetone alcohol without reversion of the isophorone in the operation.

2. In a process for producing isophorone by condensing acetone and recovering a mixture comprising mesityl oxide, diacetone alcohol and isophorone, the improvement of substantially freeing said isophorone from mesityl oxide and diacetone alcohol which comprises distilling said mixture at a temperature of from 130° C. to 200° C. in the presence of 0.1- to 1-normal aqueous sodium hydroxide solution, a sufficient quantity of said aqueous solution being present to provide a great excess of water over that needed to hydrate the mesityl oxide in said mixture, and removing as distillate from the reaction mixture the acetone which is formed by selective and catalytic reversion of the mesityl oxide and diacetone alcohol without reversion of the isophorone in the operation.

3. In a process for producing isophorone by condensing acetone and recovering a mixture comprising mesityl oxide, diacetone alcohol and isophorone, the improvement of substantially freeing said isophorone from mesityl oxide and diacetone alcohol which comprises treating said mixture with an aqueous solution of a basic compound which has a basicity equal to that of a 0.01- to 1-normal basic solution of sodium hydroxide, a sufficient quantity of said aqueous solution being present to provide an excess of water over that needed to hydrate the mesityl oxide in said mixture, said treatment being effected at a temperature above 100° C. and under a superatmospheric pressure sufficiently high to have at least a portion of the aqueous mixture in liquid phase at said temperature, thereby selectively and catalytically reverting the mesityl oxide and diacetone alcohol to acetone without reverting isophorone to acetone, and distilling the resulting acetone from the reaction mixture.

4. In a process for producing an isophorone by condensing an aliphatic ketone and recovering a mixture of said isophorone and lower boiling saturated and unsaturated ketone by-products of said condensation, the improvement of substantially freeing the said isophorone from said lower boiling by-product ketones which comprises treating said mixture with an aqueous solution of a basic compound which has a basicity not higher than that of a 1-normal basic solution of sodium hydroxide, a sufficient quantity of said aqueous solution being present to provide an excess of water over that needed to hydrate the said lower boiling unsaturated by-product ketone in said mixture, said treatment being effected at a temperature above 100° C. and under a superatmospheric pressure sufficiently high to have at least a portion of the aqueous mixture in the liquid phase at said temperature, thereby selectively and catalytically reverting said lower boiling by-product ketones to the aliphatic ketone used in said condensation without reversion of the said isophorone and separating the thus formed aliphatic ketone from said isophorone.

SUMNER H. McALLISTER.
WILLIAM A. BAILEY, Jr.